United States Patent
Chartier et al.

(10) Patent No.: US 9,563,714 B2
(45) Date of Patent: Feb. 7, 2017

(54) MAPPING SELECTIONS BETWEEN A BROWSER AND THE ORIGINAL FILE FETCHED FROM A WEB SERVER

(75) Inventors: Daniel P. Chartier, Seattle, WA (US); Joseph M. Davis, Issaquah, WA (US); Jorge E. Gabuardi Gonzalez, Seattle, WA (US); Vishal R. Joshi, Redmond, WA (US); Michael J. Harder, Bellevue, WA (US); Michael Bach, Seattle, WA (US); Anh Thi-Phuong Phan, Renton, WA (US); Reshmi Mangalore, Redmond, WA (US); Jon E. Jung, Redmond, WA (US)

(73) Assignee: MICROSOFT TECHNOLOGY LICENSING LLC., Redmond, WA (US)

( * ) Notice: Subject to any disclaimer, the term of this patent is extended or adjusted under 35 U.S.C. 154(b) by 0 days.

(21) Appl. No.: 13/161,539

(22) Filed: Jun. 16, 2011

(65) Prior Publication Data
US 2012/0324331 A1   Dec. 20, 2012

(51) Int. Cl.
*G06F 17/00* (2006.01)
*G06F 17/30* (2006.01)

(52) U.S. Cl.
CPC ............... *G06F 17/30896* (2013.01)

(58) Field of Classification Search
CPC ............. G06F 17/2241; G06F 17/2247; G06F 17/30896; G06F 17/30961
USPC ................................................. 715/234, 210
See application file for complete search history.

(56) References Cited

U.S. PATENT DOCUMENTS

| | | | |
|---|---|---|---|
| 5,740,444 A | 4/1998 | Frid-Nielsen |
| 5,964,836 A | 10/1999 | Rowe et al. |
| 6,023,764 A | 2/2000 | Curtis |
| 6,038,573 A | 3/2000 | Parks |
| 6,083,276 A | 7/2000 | Davidson et al. |
| 6,092,100 A | 7/2000 | Berstis et al. |
| 6,178,433 B1 | 1/2001 | Nakamura et al. |
| 6,247,020 B1 | 6/2001 | Minard |
| 6,317,885 B1 | 11/2001 | Fries |

(Continued)

FOREIGN PATENT DOCUMENTS

| | | |
|---|---|---|
| CN | 101645009 A | 2/2010 |
| CN | 102270116 A | 12/2011 |

OTHER PUBLICATIONS

Marte, et al., "OMS: Ontology Mapping Store", Retrieved at <<http://www.sti-innsbruck.at/fileadmin/documents/thesis/OMS-ontology-Mapping-Store.pdf>>, Jan. 18, 2008, pp. 59.

(Continued)

*Primary Examiner* — Ariel Mercado
(74) *Attorney, Agent, or Firm* — Kevin Sullivan; Kate Drakos; Micky Minhas

(57) ABSTRACT

A selection in a browser in an integrated development environment can be mapped back to the original document that was fetched from a web server by uniquely identifying elements in the original document. A DOM can be created from the original document where the DOM retains the unique identifiers associated with the elements. Block lists for the original document and the DOM can be created. A differencing algorithm can be run on the two block lists. A selection in a browser can be mapped to a location in the DOM block list and the location in the DOM block list can be mapped to the original document.

20 Claims, 7 Drawing Sheets

(56) References Cited

U.S. PATENT DOCUMENTS

| | | |
|---|---|---|
| 6,330,572 B1 | 12/2001 | Sitka |
| 6,393,569 B1 | 5/2002 | Orenshteyn |
| 6,502,239 B2 | 12/2002 | Zgarba et al. |
| 6,609,246 B1 | 8/2003 | Guhr et al. |
| 6,990,653 B1 | 1/2006 | Burd et al. |
| 7,143,115 B2 | 11/2006 | Jones et al. |
| 7,155,478 B2 | 12/2006 | Ims et al. |
| 7,191,405 B1 | 3/2007 | Jaramillo |
| 7,246,134 B1 | 7/2007 | Kitain et al. |
| 7,316,003 B1 | 1/2008 | Dulepet et al. |
| 7,325,191 B2 | 1/2008 | Goddard et al. |
| 7,395,312 B2 | 7/2008 | Kothari et al. |
| 7,440,967 B2 | 10/2008 | Chidlovskii |
| 7,480,897 B2 | 1/2009 | Reinhardt et al. |
| 7,503,035 B2 | 3/2009 | Zeidman |
| 7,516,445 B2 | 4/2009 | Maennel et al. |
| 7,543,268 B2 | 6/2009 | Cherdron et al. |
| 7,661,064 B2 | 2/2010 | Cicerone |
| 7,689,564 B2 | 3/2010 | Deen et al. |
| 7,694,282 B2 | 4/2010 | Arkhipov et al. |
| 7,779,161 B2 | 8/2010 | Buchs et al. |
| 7,861,213 B2 | 12/2010 | Wang |
| 7,890,919 B1 | 2/2011 | Williams |
| 7,941,755 B2 | 5/2011 | Siegrist et al. |
| 8,032,597 B2 * | 10/2011 | Khoo .......................... 715/781 |
| 8,281,284 B2 | 10/2012 | Na |
| 8,356,277 B1 | 1/2013 | Bank et al. |
| 8,434,014 B1 | 4/2013 | Jaramillo |
| 8,499,237 B2 | 7/2013 | Buchs et al. |
| 8,713,520 B2 | 4/2014 | Bank et al. |
| 8,762,556 B2 | 6/2014 | Priyadarshan et al. |
| 2002/0023112 A1 | 2/2002 | Avital |
| 2002/0026461 A1 | 2/2002 | Kutay et al. |
| 2002/0073236 A1 | 6/2002 | Helgeson et al. |
| 2002/0170048 A1 | 11/2002 | Zgarba et al. |
| 2004/0003119 A1 | 1/2004 | Munir et al. |
| 2004/0034846 A1 | 2/2004 | Ortal et al. |
| 2005/0114381 A1 | 5/2005 | Borthakur et al. |
| 2005/0198565 A1 | 9/2005 | McChrystal |
| 2006/0039348 A1 | 2/2006 | Racz et al. |
| 2006/0080639 A1 | 4/2006 | Bustelo et al. |
| 2006/0206865 A1 | 9/2006 | Reinhardt et al. |
| 2007/0006155 A1 | 1/2007 | Maennel et al. |
| 2007/0011713 A1 | 1/2007 | Abramson et al. |
| 2008/0072136 A1 | 3/2008 | Lotenberg |
| 2008/0098349 A1 | 4/2008 | Lin et al. |
| 2008/0134142 A1 | 6/2008 | Nathan et al. |
| 2008/0235660 A1 | 9/2008 | Chapman et al. |
| 2008/0235671 A1 | 9/2008 | Kellogg et al. |
| 2008/0244509 A1 | 10/2008 | Buchs et al. |
| 2008/0270980 A1 | 10/2008 | Ahadian et al. |
| 2008/0276183 A1 | 11/2008 | Siegrist et al. |
| 2009/0031228 A1 | 1/2009 | Buchs et al. |
| 2009/0094579 A1 | 4/2009 | Na |
| 2009/0177959 A1 * | 7/2009 | Chakrabarti et al. ......... 715/234 |
| 2009/0178031 A1 | 7/2009 | Zhao |
| 2009/0204926 A1 | 8/2009 | Cochrane |
| 2010/0042641 A1 | 2/2010 | Kamalakantha et al. |
| 2010/0162096 A1 | 6/2010 | Morrill et al. |
| 2010/0192134 A1 | 7/2010 | Arkhipov et al. |
| 2010/0293523 A1 | 11/2010 | Ahadian et al. |
| 2011/0015917 A1 * | 1/2011 | Wang et al. .................. 715/234 |
| 2011/0023017 A1 | 1/2011 | Calvin |
| 2012/0101929 A1 | 4/2012 | Howard |
| 2014/0026115 A1 | 1/2014 | Bank et al. |
| 2014/0096108 A1 | 4/2014 | Austin |

OTHER PUBLICATIONS

Ashfield, et al., "System-independent file management and distribution services", Retrieved at <<http://ieeexplore.ieee.org/stamp/stamp.jsp?tp=&arnumber=5387567>>, IBM Systems Journal, vol. 28, No. 2, 1989, pp. 241-259.

Shannon, et al., "Deep Diffs: Visually Exploring the History of a Document", Retrieved at <<http://rossshannon.com/publications/softcopies/Shannon2010DeepDiffs.pdf>>, Proceedings of the International Conference on Advanced Visual Interfaces, AVI, May 26-28, 2010, pp. 4.

Ellis, et al., "Plagiarism Detection in Computer Code", Retrieved at <<http://www.rose-hulman.edu/class/csse/faculty-staff/csse-department/seniorTheses/Matt Ellis.pdf>>, Mar. 23, 2005, pp. 1-10.

Chevalier, et al., "Using Text Animated Transitions to Support Navigation in Document Histories", Retrieved at <<http://dmrussell.net/CHI20101docs/p683.pdf>>, Conference on Human Factors in Computing Systems, Apr. 10-15, 2010, pp. 683-692.

"Fetching an image and associated metadata with an AJAX request", Retrieved at <<http://stackoverflow.com/questions/939596/fetching-an-image-and-associated-metadata-with-an-ajax-request>>, Jun. 2, 2009, pp. 3.

Kerrigan, et al., "The Web Service Modeling Toolkit—An Integrated Development Environment for Semantic Web Services (System Description)", Retrieved at http://citeseerx.ist.psu.edu/viewdoc/summani?doi=10.1.1.98.3350, Proceedings of the 4th European conference on the Semantic Web: Research and Applications, 2007, pp. 1-10.

Wuyts, et al., "Unanticipated integration of development tools using the classification model", Retrieved at http:// rmod.lille.inria.fr/archives/papers/Wuyt04a-Official-COMLAN-Classifications.pdf, Computer Languages, Systems and Structures 30, 2004, pp. 63-77.

"International Search Report", Mailed Date: Feb. 1, 2013, Application No. PCT/US2012/040956, Filed Date: Jun. 5, 2012, pp. 14.

"USPTO First Office Action", Mailed Date: Oct. 25, 2013, U.S. Appl. No. 13/161,529, filed Jun. 16, 2011, pp. 15.

Lie et al., "Cascading Style Sheet Designing for the Web," Third Edition, Published 2005, pp. 13.

"International Search Report", Mailed Date: Feb. 1, 2013, Application No. PCT/US2012/040957, Filed Date: Jun. 5, 2012, pp. 9.

"USPTO First Office Action", Mailed Date: Jun. 24, 2013, U.S. Appl. No. 13/161,559, filed Jun. 16, 2011, pp. 20.

"USPTO Final Office Action", Mailed Date: Oct. 30, 2013, U.S. Appl. No. 13/161,559, filed Jun. 16, 2011, pp. 21.

"Search Report Issued in European Patent Application No. 12800005.6", Mailed Date: Dec. 3, 2014, 9 Pages.

"USPTO Final Office Action", Mailed Date: Apr. 29, 2014, U.S. Appl. No. 13/161,529, filed Jun. 16, 2011, pp. 20.

"USPTO Non-Final Office Action", Mailed Date: Dec. 23, 2014, U.S. Appl. No. 13/161,529, filed Jun. 16, 2011, pp. 15.

"USPTO Final Office Action", Mailed Date: Jul. 16, 2015, U.S. Appl. No. 13/161,529, filed Jun. 16, 2011, pp. 17.

"USPTO Advisory Action", Mailed Date: Jan. 18, 2014, U.S. Appl. No. 13/161,559, filed Jun. 16, 2011, pp. 3.

"USPTO Non-Final Office Action", Mailed Date: Aug. 15, 2014, U.S. Appl. No. 13/161,559, filed Jun. 16, 2011, pp. 19.

"USPTO Final Office Action", Mailed Date: Apr. 23, 2015, U.S. Appl. No. 13/161,559, filed Jun. 16, 2011, pp. 22.

"USPTO Final Office Action", Mailed Date: Aug. 20, 2015, U.S. Appl. No. 13/161,559, filed Jun. 16, 2011, pp. 21.

"China First Office Action", Mailed Date: Sep. 1, 2015, Application No. 201080029384.9, Filed Date: Jun. 5, 2012, pp. 12.

"European Search Report", Mailed Date: Dec. 3, 2014, Application No. 12800005.6, Filed Date: Jun. 12, 2012, pp. 9.

"China First Office Action", Mailed Date: Oct. 10, 2015, Application No. 201280029539.9, Filed Date: Jun. 5, 2012, pp. 16.

"European Search Report", Mailed Date: Nov. 3, 2014, Application No. 12801264.8, Filed Date: Jun. 5, 2012, pp. 9.

Ellie Quigley, et al., PHP and MySQL by Example, Boston, Pearson Education Inc., 2007, p. 1-802.

"USPTO Non-Final Office Action", Mailed Date: Jan. 21, 2016, U.S. Appl. No. 13/161,529, filed Jun. 16, 2011, pp. 17.

"Office Action Issued in European Patent Application No. 12801264.8", Mailed Date: Aug. 1, 2016, 4 Pages.

"Final Office Action Issued in U.S. Appl. No. 13/161,529", Mailed Date: Aug. 22, 2016, 18 Pages.

"Notice of Allowance Issued in U.S. Appl. No. 13/161,559", Mailed Date: Mar. 14, 2016, 16 Pages.

(56) References Cited

OTHER PUBLICATIONS

"Notice of Allowance Issued in U.S. Appl. No. 13/161,559", Mailed Date: May 20, 2016, 13 Pages.
"Second Office Action and Search Report Issued in Chinese Patent Application No. 201280029384.9", Mailed Date: Mar. 23, 2016, 17 Pages.
"Second Office Action Issued in Chinese Patent Application no. 201280029539.9", Mailed Date: May 26, 2016, 10 Pages.
"Notice of Allowance Issued in Japanese Patent Application No. 2014-515870", Mailed Date: May 6, 2016, 3 Pages. (W/o English Translation).
"Office Action Issued in Japanese Application No. 2014-515870", Mailed Date: Nov. 13, 2015, 5 Pages.
"Third Office Action Issued in Chinese Patent Application No. 201280029384.9", Mailed Date: Sep. 23, 2016, 16 Pages.

* cited by examiner

MAPPING SELECTIONS BETWEEN A BROWSER AND THE ORIGINAL FILE FETCHED FROM A WEB SERVER

CROSS-REFERENCE TO RELATED APPLICATIONS

The application is related in subject matter to patent application Ser. No. 13/161,529 entitled "LIVE BROWSER TOOLING IN AN INTEGRATED DEVELOPMENT ENVIRONMENT" and patent application Ser. No. 13/161,559 entitled "SELECTION MAPPING BETWEEN FETCHED FILES AND SOURCE FILES", filed herewith.

BACKGROUND

The World Wide Web has become a ubiquitous part of modern life. Correspondingly, web development is a burgeoning industry. Web development differs from traditional software development in several profound ways. In response to an HTTP request from a browser, a web server can send a response (e.g., an HTML document) back to the browser. After the browser has loaded the document received from the server into the browser, a scripting language that adds interactive features to the web page may add, delete, or modify contents in the document.

The way web processing works affects web development. For example, after the scripting language executes, the view presented by the browser can differ from the view that was produced from the original file that came from the web server. Similarly, the underlying HTML from which the view is generated can differ from the original HTML that was received from the web server. There is presently no automated way to map a selection in the browser back to the HTML file received from the web server.

SUMMARY

A selection in a browser in an integrated development environment can be mapped back to the original document that was fetched from a web server by creating associations between a DOM tree and the original document that was fetched from a web server, mapping a browser selection to the DOM and using the associations between the DOM and the original fetched file to map the selection in the browser to the original document that was fetched from a web server. Location ranges in the file fetched from the web server can be mapped back to the corresponding location ranges in the browser.

A copy of the original file received from the server can be maintained. As a scripting language executes, changes to the underlying HTML can be compared to the original HTML received from the web server. A block list for the HTML file and a block list for the DOM can be created where identical blocks are assigned identical identifiers so that if an element in the DOM moves as a result of the execution of the scripting language, the element can still be mapped to the original HTML received from the web server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In accordance with aspects of the subject matter disclosed herein, a selection in a browser may be mapped to the original file that was fetched from a web server, even if the document rendered in the browser has been modified. A selection in the fetched file can be mapped back to what it displays in a browser. A selection can be a word, element or any location range.

When a user browses to a page of a web site, an HTML file is generated by the server and is fetched by a browser on the user's computer. The static HTML file generated by the server and fetched by the browser is called herein the fetched file. The fetched file thus is the original unmodified file received from the web server and can be the original source file for what is displayed in the browser.

HTML generates static documents comprising text, lists, tables and hyperlinks. Execution of a scripting language on the HTML file rendered in the browser can provide an interactive application-like experience so that what appears in the browser reacts to actions such as loading of a page or receiving a user selection. Scripting languages such as JAVASCRIPT®, Microsoft's JScript®, ACTIONSCRIPT®, APPLESCRIPT® , VBscript, and so on may run on the document in the browser in response to actions such as for example, a user mousing over an item on a menu list and so on. Mapping browser selections back to the fetched file is made more difficult when a scripting language executes because a scripting languages can change the DOM so that it differs from the DOM created from the HTML that was fetched from the server.

Scripting languages can provide an application-like experience using HTML as the presentation language by adding, deleting, changing and moving elements. The scripting language does this by changing the data structure that represents the data structure viewed in the browser (i.e., the DOM). In accordance with aspects of the subject matter disclosed herein, as the scripting language changes the document, a differencing algorithm can be run to map elements in the DOM to corresponding elements in the fetched file. Selections in a browser comprising any location range within the document displayed in the browser can be mapped back to the original source document fetched from the server and location ranges within the original fetched document can be mapped back to what is displayed in the browser.

Figure 1:
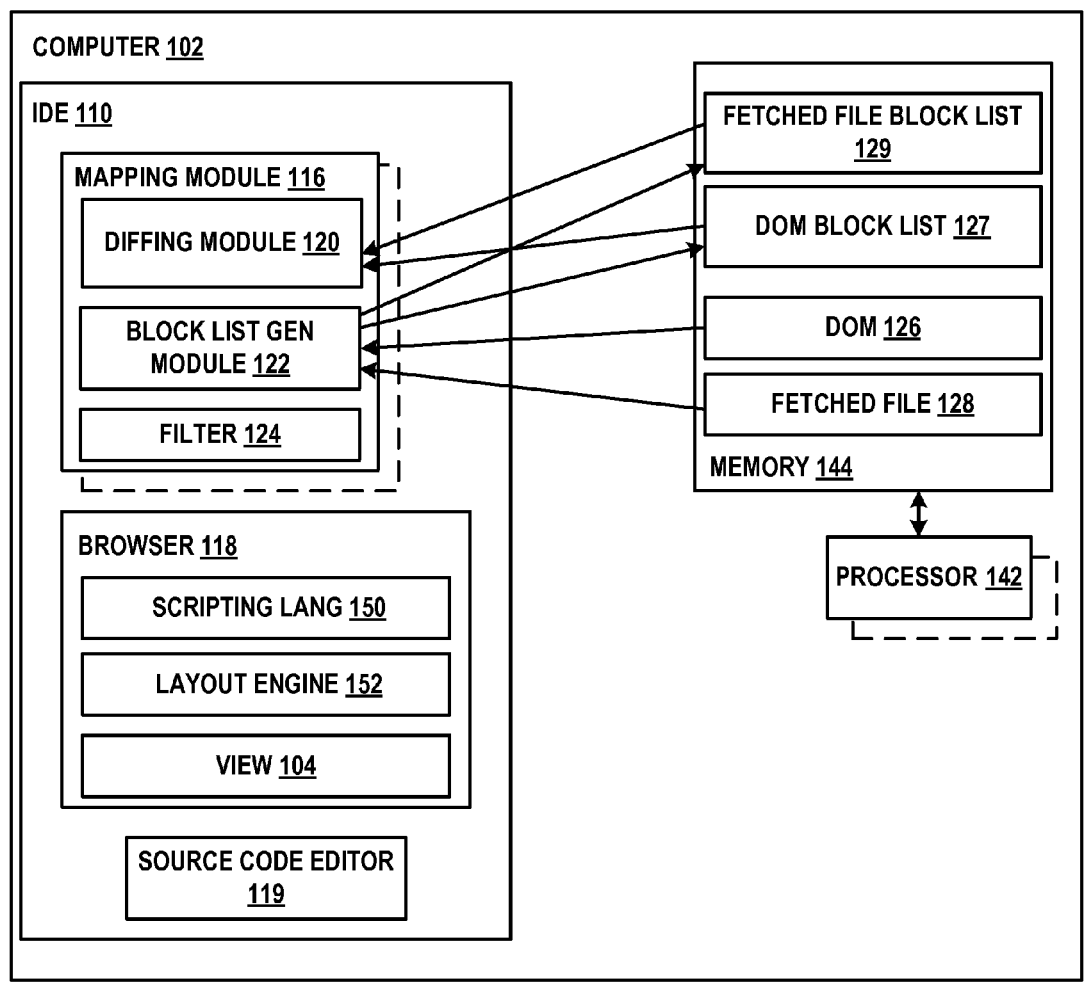
FIG. 1 illustrates an example of a system 100 that maps a selection in a browser to a file fetched from a web server in accordance with aspects of the subject matter disclosed herein.

Mapping Selections Between a Browser and the Original File Fetched from a Web Server FIG. 1 illustrates an example of a system 100 for mapping between a selection in a browser and a file fetched from a web server in accordance with aspects of the subject matter disclosed herein. All or portions of system 100 may reside on one or more computers such as the computers described below with respect to FIG. 3. System 100 may execute in whole or in part on a software development computer such as the software development computer described with respect to FIG. 4. System 100 may execute within an IDE such as IDE 110. IDE 110 can be an IDE such as the one described with respect to FIG. 4 or can be any other IDE. All or portions of system 100 may be implemented as a plug-in or add-on.

System 100 may include one or more computers or computing devices such as a computer 102 comprising: one or more processors such as processor 142, etc., a memory such as memory 144, and one or more modules such as mapping module 116, etc. that maps between a selection in a view of a file and a file fetched from a web server. Other components well known in the arts may also be included but are not here shown. It will be appreciated that one or more modules that map between a selection in a browser and the file fetched from a web server can be loaded into memory 144 to cause one or more processors such as processor 142 to perform the actions attributed to the one or more modules that map between a selection in a browser and the file fetched from a web server.

Computer 102 can represent a client computer that fetches web pages from a web server. The page fetched can be fetched over a network. The page fetched can be fetched using a network protocol such as but not limited to the HTTP protocol. Computer 102 can represent a software development computer. Computer 102 can host an IDE 110 that includes the one or more modules that map between a selection in a browser and the file fetched from a web server (e.g., mapping module 116, etc.) in accordance with aspects of the subject matter disclosed herein. Mapping module 116, etc. can include a filtering module such as filter 124. Alternatively, filter 124 can be external to mapping module 116, etc. Mapping module 116, etc. can include a differencing module such as differencing module 120. Alternatively, differencing module 120 can be external to mapping module 116, etc. Mapping module 116, etc. can include a block list generating module such as block list generating module 122. Alternatively, block list generating module 122 can be external to mapping module 116, etc. IDE 110 can include one or more of: a browser 118, a layout engine 152 and/or a scripting language 150 that executes on the file rendered in the browser. IDE 110 can include a source code editor such as source code editor 119.

System 100 can also include any or all of the following: a fetched file such as fetched file 128, a DOM such as DOM 126, a block list derived from the fetched file such as fetched file block list 129, and a block list derived from the DOM such as DOM block list 127.

Browser 118 can be any browser including but not limited to MOSAIC®, Microsoft's Internet Explorer®, MOZILLA®, NETSCAPE®, FIREFOX®and so on. Browser 118 can send a request (e.g., an HTTP request) to a web server computer (not shown) for a page of a web site. In response, the browser 118 may receive a web page from the web server. The web page may be an HTML file. The file that is received by the browser 118 can be stored in memory 144 as fetched file 128. As the HTML file is received from the web server, in accordance with some aspects of the subject matter described herein, a module such as filter 124 may assign an identifier to each element in the HTML file so that each different element is assigned its own identifier. An element in an HTML file is delimited by the presence of an HTML start tag and an HTML end tag pair. Filter 124 may be a MIME (Multipurpose Internet Mail Extension) filter that operates on MIME type "text". It will be appreciated that alternatively, an identifier may be assigned to each element in the HTML file at another time before the scripting language runs (e.g., after the HTML file is rendered in the browser). The identifier enables elements in the DOM to be mapped to elements in the fetched file and vice versa, even if a scripting language runs and elements are moved around or changed. It will be appreciated that elements that are deleted cannot be mapped. Similarly, an element that is inserted in the DOM cannot be mapped to a corresponding element in the fetched file because it is not in the fetched file. The HTML fetched file 128 can be parsed into a Document Object Model (DOM) such as DOM 126. The Document Object Model (DOM) is a cross-platform, language-independent convention for representing and interacting with objects in HTML, XHTML and XML documents. DOM elements can be addressed and manipulated by programming languages including scripting languages such as but not limited to JSCRIPT®. DOM supports navigation in any direction. That is, DOM supports navigation from a child to its parent, from a parent to its child and from a child to a previous sibling.

The DOM 126 created from the fetched file 128 can be stored in memory 144 and can be used by the layout engine 152 to display a view of the web page such as view 104 in the browser 118. The DOM 126 can be modified by execution of a scripting language. Thus, DOM 126 may change over time and is dynamic. When the browser 118 first presents the web page fetched from the server, the view 104 corresponds to the fetched file 128. Conversion of HTML into a DOM enables a scripting language to execute within the browser 118. A scripting language such as JScript may execute. When the scripting language executes, the scripting language can change the DOM. When the DOM changes, the view 104 can change in the browser. Thus, as soon as the scripting language executes, the fetched file will no longer reflect the current view. When the DOM changes, a corresponding change is reflected in the view 104.

A block list generating module such as block list generating module 122 can generate a block list (e.g., DOM block list 127) from the DOM 126. A block list generating module such as block list generating module 122 can generate a block list (e.g., fetched file block list 129) from the fetched file 128. A differencing module such as differencing module 120 can be run on the fetched file block list 129 and the DOM block list 127 to map between block lists even if the DOM no longer reflects the fetched file. The processing performed by differencing module 120 is described more fully below.

Thus, in accordance with aspects of the subject matter disclosed herein, as the scripting language changes the DOM data structure underlying the view 104 in the browser 118, a differencing algorithm can be run on the block lists for the DOM and the fetched file to handle mapping changes in the block lists. The DOM block list 127 can change to reflect changes made by execution of the scripting language.

Figure 2A:
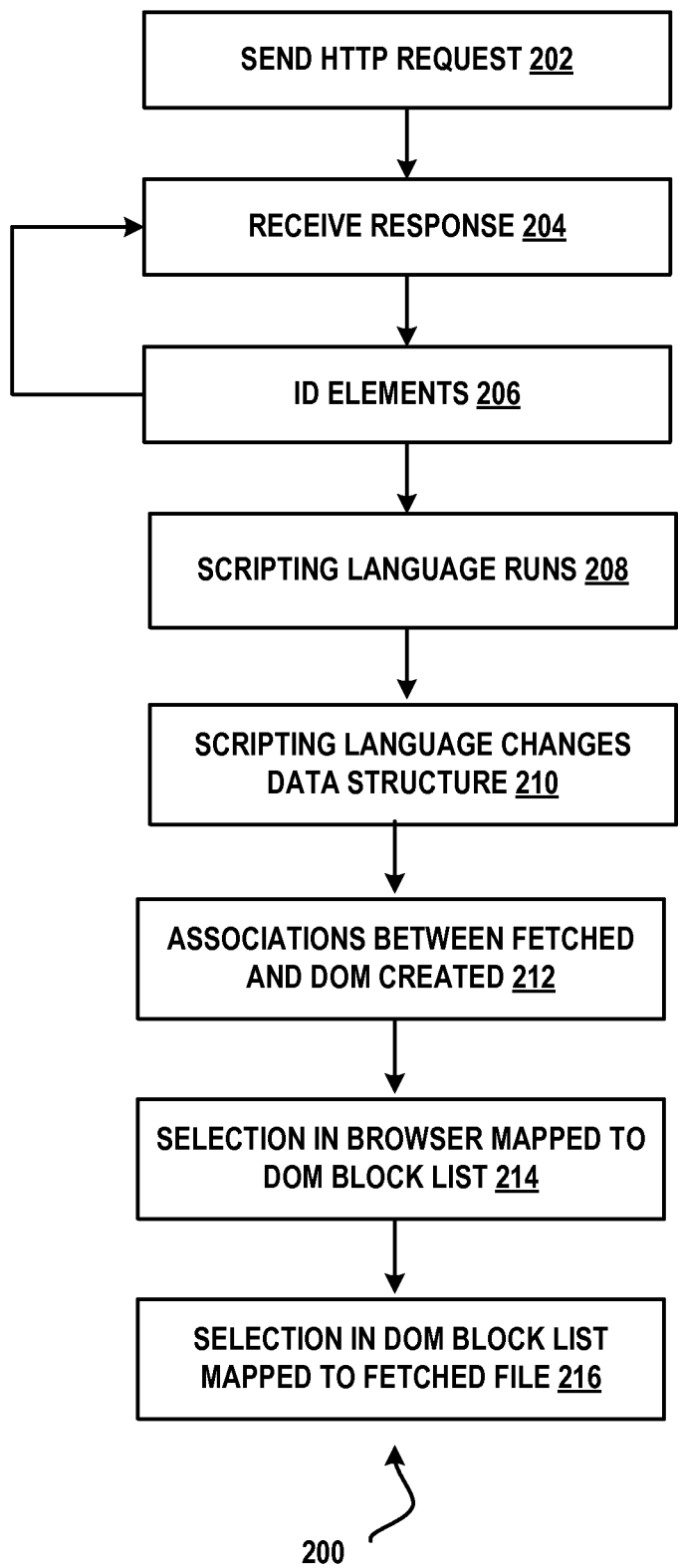
FIG. 2a illustrates an example of a method for mapping a selection in a browser to a file fetched from a web server in accordance with aspects of the subject matter disclosed herein.

FIG. 2a illustrates an example of a method 200 that maps a selection in a browser to a file fetched from a web server in accordance with aspects of the subject matter disclosed herein. The method described in FIG. 2a can be practiced by a system such as but not limited to the one described with respect to FIG. 1. Some of the actions described below can be optional. Some of the actions described below can be executed in a sequence that differs from that described below.

At 202 a browser can send a request such as an HTTP request to a web server. At 204 the browser can receive the requested file from the web server. The file received by the browser in response to the browser request is referred to herein as the fetched file. The fetched file can be an HTML file. The fetched file can be loaded into memory. At 204, as the fetched file is received, elements in the HTML file can be assigned identifiers at 206 such that each different element is assigned its own identifier. The HTML file can be converted to a DOM and rendered by the browser. During execution, at 208 a script language such as but not limited to JScript may run on the DOM. The script language may change the DOM as it executes at 210. At 212 associations between the DOM and the fetched file can be generated by matching block identifiers as described more fully below. At 214 in response to user input selecting a portion of the document displayed in the browser, the selection can be mapped to a block in the DOM block list. At 216 the block in the DOM block list can be mapped to a block in the fetched file block list which can be mapped to a location range in the fetched file.

Figure 2B:
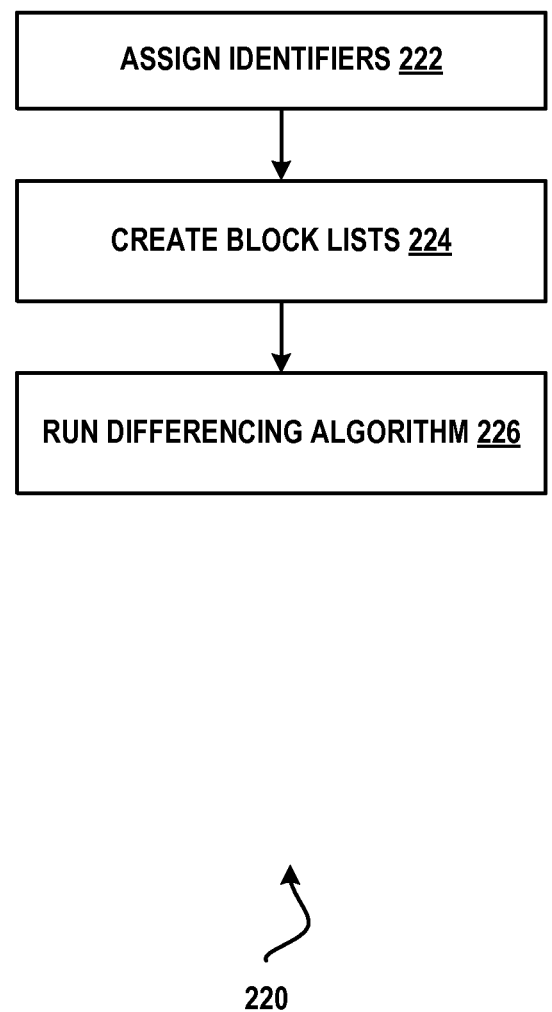
FIG. 2b illustrates an example of a method for creating associations between a DOM and an original file received from a web server in accordance with aspects of the subject matter disclosed herein.

FIG. 2b illustrates an example of a method 220 that creates associations between location ranges in a DOM and a fetched file in accordance with aspects of the subject matter disclosed herein. The method described in FIG. 2b can be practiced by a system such as but not limited to the one described with respect to FIG. 1. Some of the actions described below can be optional. Some of the actions described below can be executed in a sequence that differs from that described below.

At 222 a different identifier can be assigned to each element in the fetched file. An element can be identified by the presence of a start and end tag. At 224 a block list can be created from the fetched file. Another block list can be created from the DOM. To create a block list for the fetched file (an HTML file), the file can be parsed, and a block can be created for each start and end tag pair encountered in the HTML file. The identifier assigned to the element can be saved. A block can be created for each word in the HTML file. In accordance with some aspects of the subject matter described herein, a word can be assigned an identifier that is a hash of the word. Thus if a particular word is encountered more than once in an HTML file, each occurrence of the particular word would have the same identifier.

To create a block list for the DOM, the DOM can be converted to an HTML file and the process described above with respect to the fetched file can be used to generate the DOM block list. Alternatively, the DOM tree can be walked and a DOM block list as described above can be created therefrom. At 226 a differencing module can run a differencing algorithm on the two created block lists. The differencing algorithm can be run on the DOM block list and the fetched file block list. Each start and end tag in the HTML can be treated as a block. Thus a block can be created for every word and for every start or end tag pair in the fetched file and in the DOM. Because the same tag is frequently used more than once in an HTML document, a unique identifier can be assigned to each start tag (e.g., by setting an attribute of the corresponding element in the fetched file with a unique identifier). Words use their text as their identifier, and will therefore be non-unique if the same word exists more than once in the document. If a fetched file block has a unique identifier that matches a unique identifier of a DOM block, the two blocks are determined to be the same. Their association can be recorded. If the fetched file block has a non-unique identifier, such as is the case with text, but it exists adjacent to an associated block in the fetched file and a block with a matching identifier exists adjacent to the corresponding block in the DOM, the two blocks are determined to be the same block. Their association can be recorded. Repeated application of this process forward and backwards in the block list finds associations of unchanged blocks with non-unique identifiers. The recorded associations are used to map between the fetched file and DOM block lists and vice versa.

Figure 2C:
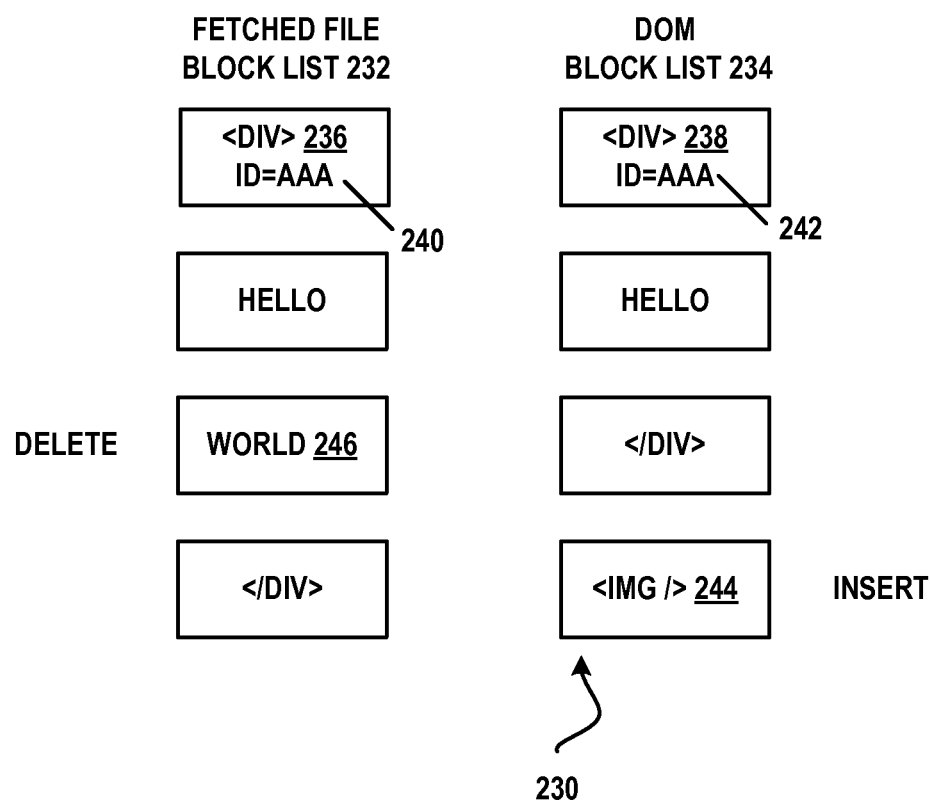
FIG. 2c illustrates an example of a block list associated with an original file received from a web server and a block list associated with a DOM rendered in a browser in accordance with aspects of the subject matter disclosed herein.

FIG. 2c illustrates an example 230 of a block list for a fetched file (e.g., fetched file block list 232) and a block list for a DOM (e.g., DOM block list 234). Identical blocks in each file can be associated with each other using the assigned identifiers (e.g., the block identified by id=AAA 240 of the fetched file block list 232 maps to the block identified by id=AAA 242 in the DOM block list 234). For example, in FIG. 2c, block 236 in fetched file block list 232 is identical to block 238 in DOM block list 234. Block 236 can be mapped to block 238 and vice versa because the identifier 240 of block 236 is identical to the identifier 242 of block 238. Block 244 in DOM block list 234 does not map to a block in fetched file block list 232 because "<img />" was added to the DOM after the fetched file was received. Block 246 ("WORLD") in fetched file block list 232 has no analogous block in the DOM block list 234 because "WORLD" was deleted in the DOM after the fetched file was received from the web server.

Blocks of text may lack identifiers (e.g., because text cannot have attributes) but blocks of text in the DOM block list can be mapped to blocks of text in the fetched file block list by assuming that unidentified blocks of text in both block lists following identified blocks with identical identifiers are identical blocks. For example, block 236 in fetched file block list 232 can be mapped to block 238 in DOM block list because the identifier id=AAA 240 in block 236 is identical to identifier id=AAA 242 in block 238.

Document selections in the browser can be mapped to the text of the dynamic browser file by determining which block in the block list for the DOM corresponds to the selection in the browser. When a selection event occurs in a browser such as Microsoft's Internet Explorer, Mozilla, etc., an object that includes the selected string and the selection context (i.e., a current position in the DOM) can be returned. To determine the block in the DOM block list that corresponds to the selection made in the browser, navigation from the current position in the DOM towards the beginning of the DOM can be conducted until a start tag with an identifier (e.g., ID=x) is found. The characters encountered in the backwards traversal until the start tag is encountered can be recorded. The corresponding block (i.e., the block with ID=x) in the DOM block list can accessed. The block list and the DOM can be traversed in a forward direction until the location corresponding to the selection is encountered. Associations between the DOM block list and the fetched file block list can be used to map to the corresponding location in the fetched file.

Figure 2D:
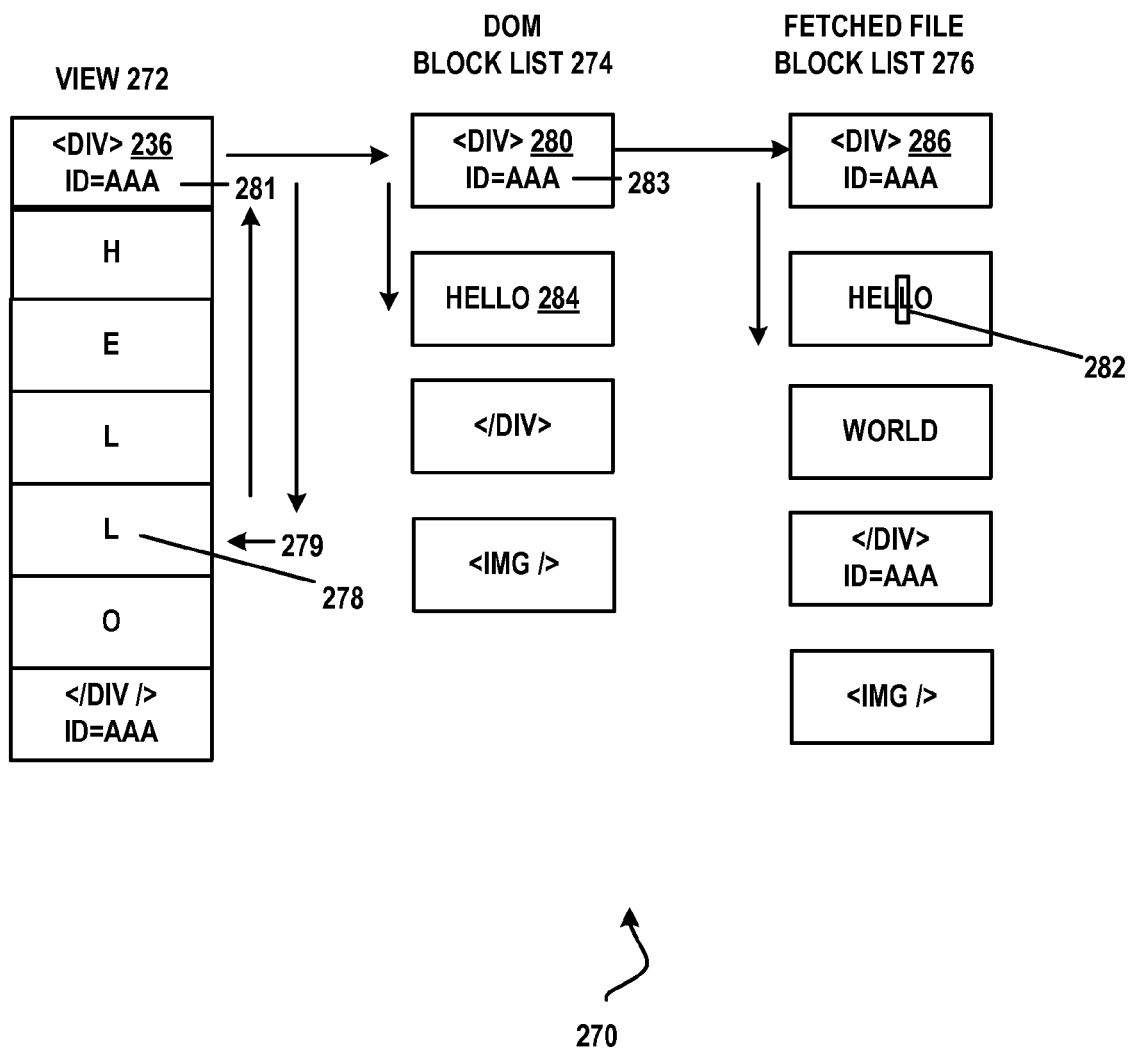
FIG. 2d illustrates an example of mapping a selection in a browser to a DOM block list and mapping a block list in the DOM block list to a block list associated with an original file received from a web server in accordance with aspects of the subject matter disclosed herein.

FIG. 2d illustrates an example 270 of mapping from a selection (e.g., selected text) in the browser to the DOM block list and then to the fetched file. Suppose the following code is found in the file being viewed in the browser:

```
<div _ID="AAA">
    Hello
    <img src=". . ." />
</div>
```

Suppose the user selects the second letter "l" from the word Hello (selection 278) in the view. The selection event can return an object with the selected string and the selection position in the document. Starting from a current position 279 in the DOM (e.g., view 272), the DOM can be traversed, moving left in the data structure, upwards in FIG. 2d, towards the beginning of the DOM, until the first element that contains an ID that can map to the fetched document is found (e.g., to block 236). Along the way, the characters encountered can be recorded (i.e. in the example, "L", "L", "E", "H" and "<DIV>" may be recorded).

Using the identifier for the start tag (ID=AAA) 281, the block in the DOM block list 274 with ID=AAA 283, block 280 can be accessed. Both the DOM (view 272) and the DOM block list 274 are traversed in a forward direction until the recorded characters "<DIV>", "H", "E", "L", "L" have been encountered. The associations between the DOM block list 274 and the fetched file block list 276 can be used to map to map "L" in block 284 to "L" 282 in the fetched file block list 276 to a corresponding location range in the fetched file.

Example of a Suitable Computing Environment

Figure 3:
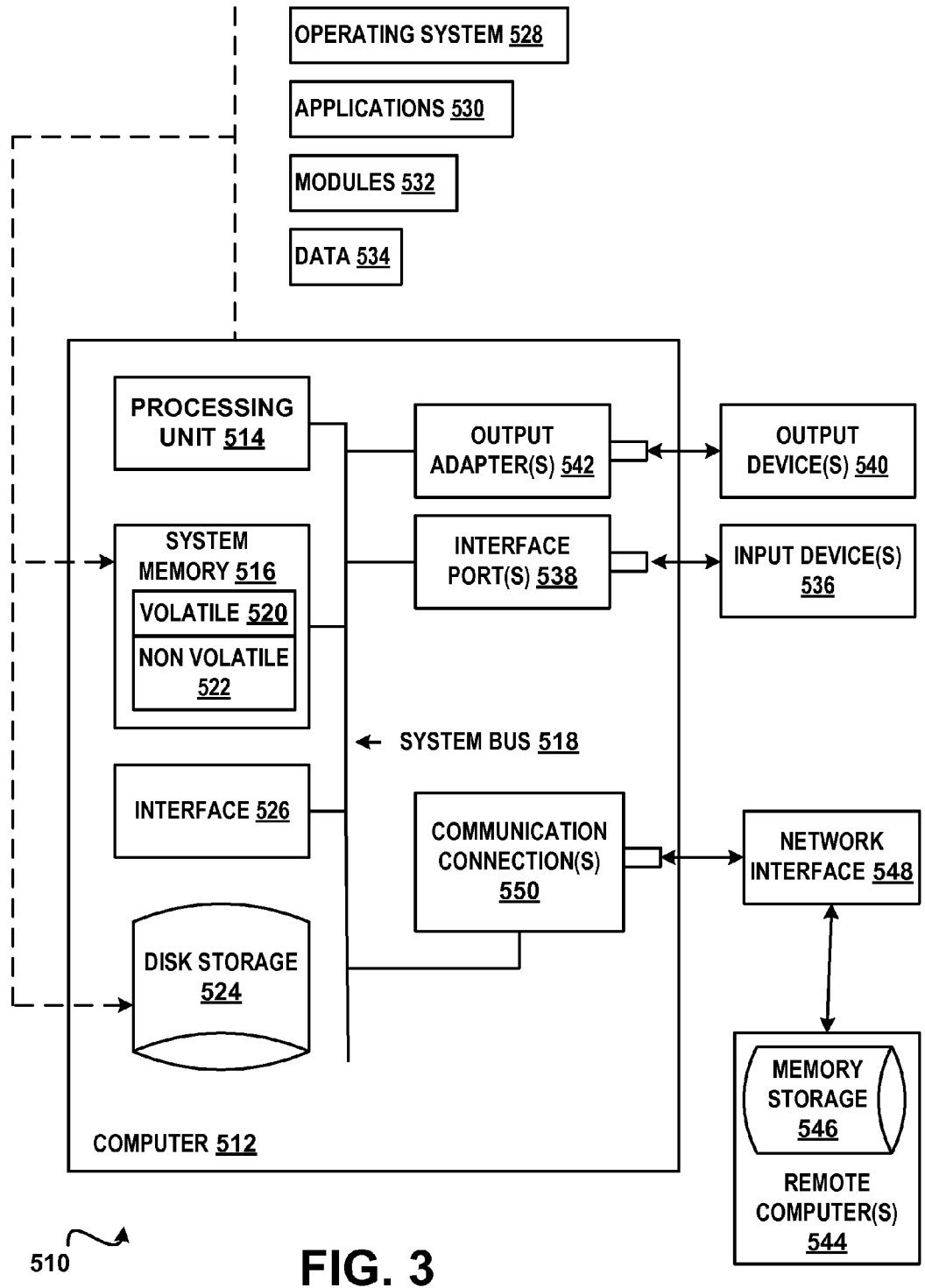
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
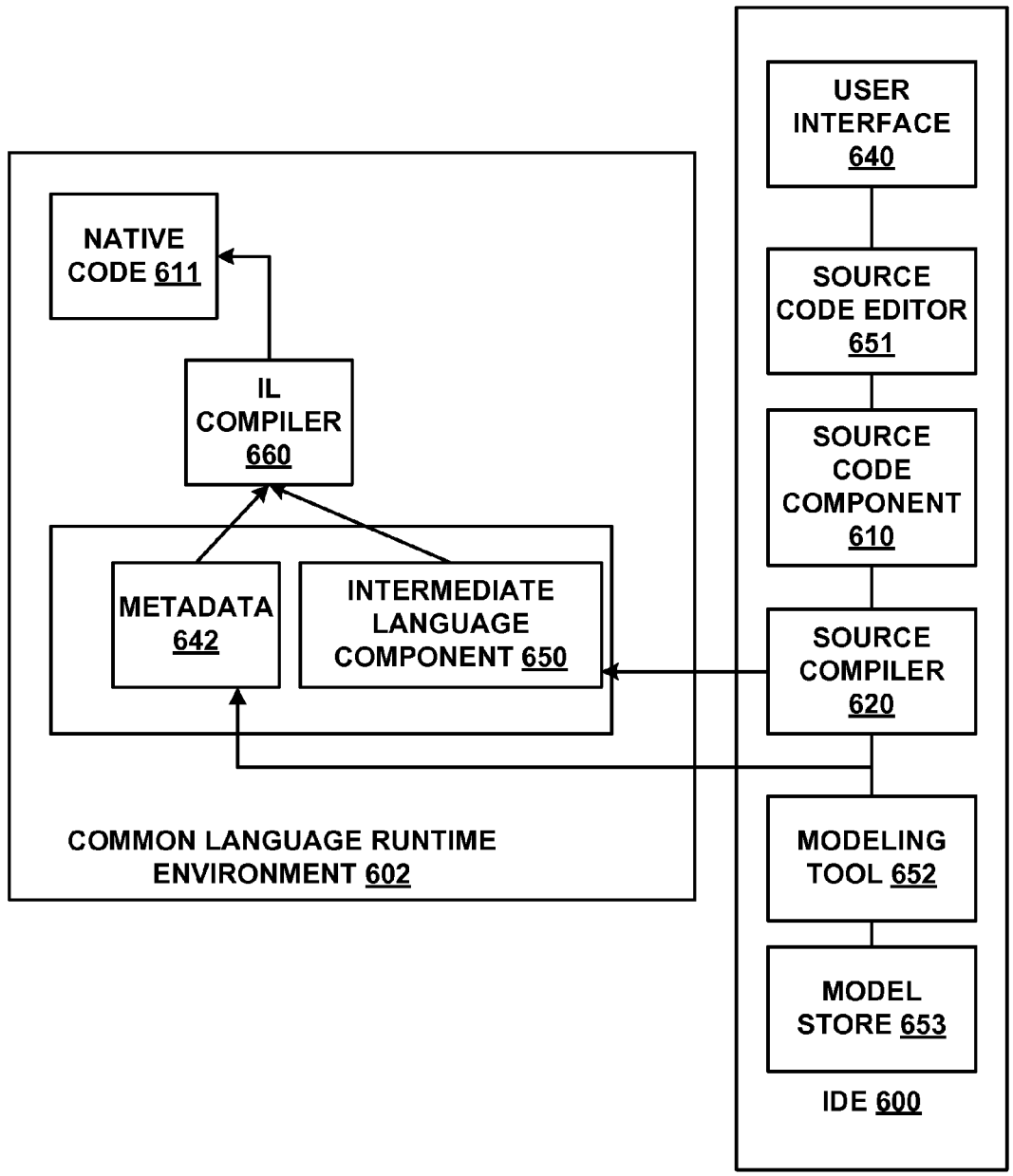
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., VISUAL BASIC®, VISUAL J#®, C++, C#, J#, JAVASCRIPT®APL, COBOL, Pascal, EIFFEL®, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    at least one processor of a computing device;
    a memory of the computing device; and
    at least one module loaded into the memory causing the at least one processor to:
    obtain an original file fetched from a web server, the original file comprising a fetched file;
    create a Document Object Model (DOM) representing the fetched file, the DOM having a structure for representing data in the fetched file that differs from the fetched file;
    create associations between location ranges in the DOM and location ranges in the fetched file;
    create a block list for the DOM;
    create a block list for the fetched file;
    map a selection in a browser to the DOM block list; and
    using the associations created between the location ranges in the DOM and the location ranges in the fetched file, map the selection in the browser to the fetched file.

2. The system of claim 1, further comprising at least one module that when loaded into the memory causes the at least one processor to:
    create the associations between elements in the DOM and elements in the fetched file by:
    assigning a unique identifier to each element of a plurality of elements in the fetched file, wherein an element of the plurality of elements is delimited by an HyperText Markup Language (HTML) start tag and an HTML end tag.

3. The system of claim 2, further comprising at least one module that when loaded into the memory causes the at least one processor to:
    create a block in the block list for the fetched file for each word in the fetched file; and create a block in the block list for the DOM for each word in the DOM.
4. The system of claim 2, further comprising at least one module that when loaded into the memory causes the at least one processor to:
create a block in the block list for the fetched file for each start tag and for each end tag in the fetched file;
create a block in the block list for the DOM for each start tag and for each end tag in the DOM.
5. The system of claim 2, further comprising at least one module that when loaded into the memory causes the at least one processor to:
map associations between the block list for the fetched file and the block list for the DOM by matching block identifiers.
6. The system of claim 2,
wherein a block in the block list for the fetched file is identical to a block in the block list for the DOM when the block in the fetched file block list is immediately adjacent to a unique block in the fetched file block list and an identical block exists next to the corresponding unique block in the DOM block list.
7. The system of claim 2, wherein:
mapping the selection in the browser to the DOM block list comprises:
determining a block in the DOM block list that corresponds to the selection in the browser by navigating from a current position in the DOM backwards towards the beginning of the DOM until an element with an identifier is found, recording characters encountered in the navigation until the element with the identifier is found; and
accessing the correspondingly identified block in the DOM block list.
8. A method comprising:
receiving by a module of a plurality of modules executing within an Integrated Development Environment (IDE) of a software development computer, the module executed by a processor of the software development computer, an HyperText Markup Language (HTML) file from a web server, the HTML file comprising a fetched file;
assigning each element of a plurality of elements in the fetched file an identifier, wherein an identifier of an element of the plurality of elements uniquely identifies the element;
converting the fetched file to a Document Object Model (DOM), retaining the assigned identifiers, the DOM having a structure for representing data in the fetched file that differs from the fetched file;
executing a scripting language on the DOM, modifying the DOM;
creating a block list for the DOM;
creating a block list for the fetched file
mapping a selection in a browser to the DOM block list; and using the identifiers assigned to each element in the fetched file and retained in the DOM, mapping the selection in the browser to a block in the DOM block list, mapping the block in the DOM block list to a block in the block list for the fetched file, and matching the block in the block list for the fetched file a location in the fetched file.
9. The method of claim 8, further comprising:
executing a differencing algorithm on the block list for the fetched file and the block list for the DOM.
10. The method of claim 9, wherein two blocks are determined to be the same block by determining that immediately adjacent to a unique block in the fetched file an identical block exists next to the corresponding unique block in the DOM.
11. The method of claim 10, wherein a selection in a browser is mapped to a block of text in the DOM block list by finding a preceding unique identifier by traversing the DOM backward, recording characters encountered when traversing from a current position to the preceding unique identifier, finding the unique identifier in the DOM block list and traversing the DOM and the DOM block list forwards, character by character until the selection is encountered.
12. The method of claim 8, further comprising;
creating a block in the block list for the fetched file for each word in the fetched file; and
creating a block in the DOM block list for each word in the DOM.
13. The method of claim 12, further comprising:
creating a block in the block list for the fetched file for each start tag in the fetched file and creating a block in the block list for the fetched file for each end tag in the fetched file;
creating a block in the DOM block list for each start tag in the DOM and creating a block in the DOM block list for each end tag in the DOM; and
in response to determining that the start tag identifier for a block in the block list for the fetched file is identical to the start tag identifier for a block in the DOM block list, mapping the block in the fetched file block list to the block in the DOM block list.
14. A device, comprising:
at least one processor and a memory, the at least one processor configured to:
receive by the at least one processor of the computing device an HyperText Markup Language (HTML) file comprising a file fetched from a web server;
assign a unique identifier to an element for each element in the fetched file;
convert the fetched file to a Document Object Model (DOM), retaining the assigned unique identifiers, the DOM having a structure for representing data in the fetched file that differs from the fetched file;
execute a scripting language on the DOM, generating a modified DOM;
create a DOM block list from the modified DOM;
create a block list for the fetched file from the fetched file;
map a selection in a browser file to a location in the fetched file using the assigned unique identifiers.
15. The device of claim 14, the at least one processor further configured to:
run a differencing algorithm on the block list for the fetched file and the DOM block list.
16. The device of claim 15, the at least one processor further configured to:
create a block in the block list for the fetched file for each word in the fetched file; and
create a block in the DOM block list for each word in the modified DOM.
17. The device of claim 16, the at least one processor further configured to:
create a block in the block list for the fetched file for each start tag in the fetched file and create a block in the block list for the fetched file for each end tag in the fetched file; and
create a block in the DOM block list for each start tag in the modified DOM and create a block in the DOM block list for each end tag in the modified DOM.

18. The device of claim 17, the at least one processor further configured to:
   determine that two blocks are the same block by determining that immediately adjacent to a unique block in the fetched file an identical block exists next to the corresponding unique block in the modified DOM.

19. The device of claim 18, the at least one processor further configured to:
   map a block of text in the DOM block list to a block of text in the block list for the fetched file by finding a preceding unique identifier by traversing the modified DOM backward, recording characters encountered when traversing from a current position in the modified DOM to the unique identifier, finding the unique identifier in the DOM block list and traversing the DOM block list forwards until the block of text is encountered.

20. The device of claim 19, the at least one processor further configured to:
   map a block in a DOM block list to a block in the block list for the fetched file using the unique identifier of the block in the DOM block list.

\* \* \* \* \*